US007883244B2

(12) United States Patent
Hsu et al.

(10) Patent No.: US 7,883,244 B2
(45) Date of Patent: Feb. 8, 2011

(54) ILLUMINATING DEVICE WITH DRYING AGENT

(75) Inventors: Hung-Kuang Hsu, Miao-Li Hsien (TW); Wen-Jang Jiang, Miao-Li Hsien (TW); Tse-An Lee, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 278 days.

(21) Appl. No.: 12/177,390

(22) Filed: Jul. 22, 2008

(65) Prior Publication Data

US 2009/0122570 A1 May 14, 2009

(30) Foreign Application Priority Data

Nov. 9, 2007 (CN) ........................ 2007 10 202450

(51) Int. Cl.
*B60Q 3/04* (2006.01)
*F21V 21/00* (2006.01)
*F21V 29/00* (2006.01)

(52) U.S. Cl. ........................ 362/362; 362/545; 362/294; 362/267; 362/547

(58) Field of Classification Search ................... 362/96, 362/267, 294, 373, 547, 362, 545
See application file for complete search history.

(56) References Cited

U.S. PATENT DOCUMENTS

| | | | | |
|---|---|---|---|---|
| 4,809,144 | A * | 2/1989 | Suzuki | 362/547 |
| 6,422,729 | B1 * | 7/2002 | Rohrbach et al. | 362/547 |
| 6,883,948 | B2 * | 4/2005 | VanDuyn et al. | 362/547 |
| 7,217,314 | B2 | 5/2007 | DeGuiseppi et al. | |
| 7,267,459 | B2 * | 9/2007 | Matheson | 362/362 |

FOREIGN PATENT DOCUMENTS

| | | |
|---|---|---|
| CN | 2617114 Y | 5/2004 |
| CN | 1638568 A | 7/2005 |
| TW | 211288 | 8/1993 |
| TW | M268525 | 6/2005 |

* cited by examiner

*Primary Examiner*—Stephen F Husar
*Assistant Examiner*—James W Cranson
(74) *Attorney, Agent, or Firm*—Andrew C. Cheng

(57) ABSTRACT

An exemplary illuminating device includes a light source container, a light source and a drying chamber. The light source container includes a receiving room. The light source is received in the receiving room. The drying chamber has desiccant received therein and communicates with the receiving room. The desiccant is configured for absorbing moisture in the illuminating device, therefore, drying the illuminating device.

11 Claims, 1 Drawing Sheet

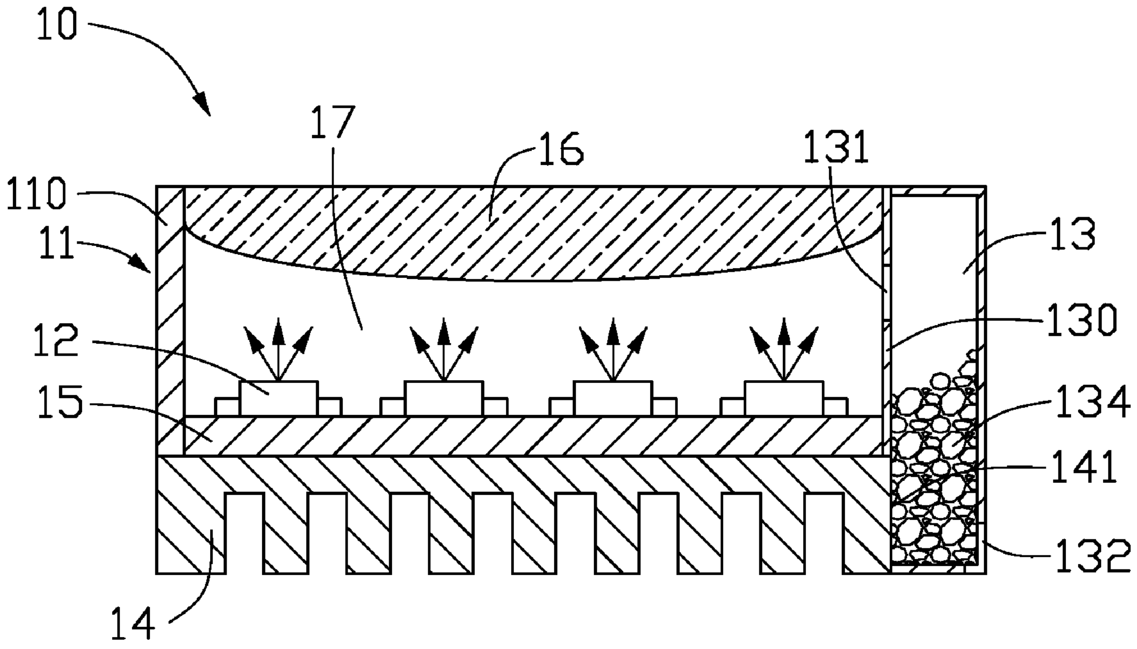
10
17
16
131
110
11
13
130
12
15
134
141
132
14

ILLUMINATING DEVICE WITH DRYING AGENT

BACKGROUND

1. Technical Field

The present invention generally relates to illuminating devices and, particularly, to an illuminating device capable of absorbing moisture.

2. Discussion of Related Art

Nowadays, light emitting diodes (LEDs) have been used extensively as light source for illuminating devices due to their high luminous efficiency and low power consumption.

Generally, a typical illuminating device employing LEDs, includes at least an encapsulated semiconductor LED component as a light source. The encapsulated semiconductor LED component may malfunction in the humid environment. As such, the illuminating device is usually sealed to prevent moisture entering therein. However, when the weather, temperature or humidity change, the pressure difference will force the moisture to infiltrate into the sealed illuminating device, thereby damaging the LED component.

Therefore, what is needed is an illuminating device that can prevent itself from being damaged by the moisture.

SUMMARY

An illuminating device, in accordance with a present embodiment, is provided. The illuminating device includes a light source container, a light source, and a drying chamber. The light source container includes a receiving room. The light source is received in the receiving room. The drying chamber has a desiccant received therein and communicates with the receiving room. The desiccant is configured for absorbing moisture in the illuminating device, therefore, drying the illuminating device.

Detailed features of the present illuminating device will become more apparent from the following detailed description and claims, and the accompanying drawings.

BRIEF DESCRIPTION OF THE DRAWINGS

Many aspects of the present illuminating device can be better understood with reference to the following drawing. The components in the drawing are not necessarily drawn to scale, the emphasis instead being placed upon clearly illustrating the principles of the present illuminating device.

The drawing is a schematic view of an illuminating device, in accordance with an exemplary embodiment.

DETAILED DESCRIPTION OF THE PREFERRED EMBODIMENTS

Reference will now be made to the drawing to describe the embodiments of the present illuminating device, in detail.

Referring to the drawing, an illuminating device 10, according to an exemplary embodiment, is provided. The illuminating device 10 includes a light source container 11, at least one light source 12 and a drying chamber 13.

The light source container 11 includes a baffle plate 110. The baffle plate 110 is jointed with a side wall 130 of the drying chamber 13. In the exemplary embodiment, the illuminating device 10 further includes a circuit board 15 and a light pervious cover 16. The circuit board 15 is jointed with the bottoms of the baffle plate 110 and the side wall 130. The baffle plate 110, the side wall 130, the circuit board 15, and the light pervious cover 16 cooperatively form the light source container 11, and a receiving room 17 is defined in the light source container 11. The receiving room 17 is configured for receiving the light source 12 therein. The receiving room 17 is sealed by the light pervious cover 16, the baffle plate 110, the side wall 130 and the circuit board 15. The light pervious cover 16 faces towards the light source 12. Light emitted from the light source 12 passes through the light pervious cover 16 to the outside. In the exemplary embodiment, the light pervious cover 16 is an optical lens.

The light source 12 is arranged on and electrically connected to the circuit board 15. Thereby, the light source 12 can be electrically connected to an outer circuit or a power supply via the circuit board 15. In this exemplary embodiment, the light source 12 is a surface-mounted type light emitting diode (LED) including at least one LED chip and an encapsulant for encapsulating the at least one LED chip. Besides surface-mounted type, the light source 12 can also be LEDs encapsulated by other types. The LED can be white light LED or LED that can emit light with other colors.

The drying chamber 13 includes an inlet 131 communicating with the light source container 11. The inlet 131 is defined in the side wall 130 of the drying chamber 13. The drying chamber 13 has a desiccant 134 received therein. The desiccant 134 is configured for absorbing moisture in the illuminating device 10, therefore, drying the illuminating device 10. The desiccant 134 may be selected from a group consisting of lime desiccant, alumina, calcium chloride, calcium sulphate and silica gel, and represent granular. The desiccant 134 also may be molecular sieves, which are a kind of silicoaluminate having a network crystal structure. The network crystal structure has a plurality of hollow holes orderly aligned therein, and the hollow holes take up 50% volume of the whole molecular sieves. One gram of the molecular sieve has an inner surface area of 700~800 square meter, and the moisture can be absorbed on to the inner surface of the hollow holes of the molecular sieve.

In the exemplary embodiment, the illuminating device 10 further includes a heat sink 14. The heat sink 14 is attached to the circuit board 15 and thereby thermally coupled to the light source 12. The heat sink 14 is configured for dissipating heat generated from the light source 12 and heating the desiccant 134 to separate the moisture absorbed by the desiccant 134 to release out of the drying chamber 13. Concretely, a side wall of the drying chamber 13 has an outlet 132 configured therein. The outlet 132 communicates with external atmosphere. The moisture will be released out of the drying chamber 13 via the outlet 132.

In the exemplary embodiment, the heat sink 14 includes a plurality of fins, and the heat sink 14 is made of materials with high thermal conductivity, such as aluminum, cooper and alloy there of. The circuit board 15 includes a plurality of heat conductive members (not illustrated) arranged thereon/therein, as such the light source 12 is thermally connected with the heat sink 14 by the heat conductive members. Concretely, the heat conductive members can be heat pipes.

In this exemplary embodiment, for reducing heat resistance between the heat sink 14 and the drying chamber 13, a side wall of the heat sink 14 is configured as a part of side wall 130 of the drying chamber 13.

On the condition that the illuminating device 10 is not activated, moisture in the illuminating device 10 is absorbed by the desiccant 134. When the illuminating device 10 is activated, heat generated from the light source 12 is conducted to the heat sink 14 and the desiccant 134 is heated by the heat sink 14. As such, the moisture absorbed by the desiccant 134 will be released out of the illuminating device 10.

Preferably, a net structure is arranged in the inlet 131, thereby preventing the desiccant 134 from entering the light source container 11 and permitting moisture passing there through.

In summary, due to the illuminating device 10 being equipped with desiccant 134 and heat sink 14 for absorbing moisture and releasing the moisture out of the illuminating device 10, the illuminating device 10 can always works without being damaged by moisture.

Finally, it is to be understood that the above-described embodiments are intended to illustrate rather than limit the invention. Variations may be made to the embodiments without departing from the spirit of the invention as claimed. The above-described embodiment illustrates the scope of the invention but do not restrict the scope of the invention.

What is claimed is:

1. An illuminating device, comprising:

a light source container having a receiving room;

a light source received in the receiving room; and a drying chamber having a desiccant received therein, the drying chamber being arranged at a periphery side of the receiving room and adjacent to the receiving room, the drying chamber communicating with the receiving room, the desiccant configured for absorbing moisture.

2. The illuminating device according to claim 1, further comprising a circuit board, the light source being arranged on the circuit board and electrically connected to the circuit board.

3. The illuminating device according to claim 2, wherein the drying chamber having an inlet communicating with the receiving room and an outlet communicating with the atmosphere.

4. The illuminating device according to claim 3, wherein the light source container comprises a light pervious cover facing toward the light source.

5. The illuminating device according to claim 4, wherein the cover is an optical lens.

6. The illuminating device according to claim 1, further comprising a heat sink thermally coupled to the light source and the desiccant, wherein the heat sink is configured for absorbing heat generated from the light source and heating the desiccant.

7. The illuminating device according to claim 1, further comprising an inlet arranged between the drying chamber and the receiving room, and an outlet in a sidewall of the drying chamber and distal from the receiving room.

8. The illuminating device according to claim 7, wherein the drying chamber has a network structure arranged in the inlet.

9. The illuminating device according to claim 1, wherein the light source includes a light emitting diode.

10. The illuminating device according to claim 1, wherein the desiccant is molecular sieve, lime desiccant, alumina, calcium chloride, calcium sulphate or silica gel, and the desiccant represent granular.

11. An illuminating device comprising:

a chamber comprising a first compartment and a second compartment;

a light source received in the first compartment;

a desiccant received in the second compartment for absorbing moisture in the first compartment; and a thermally conductive metallic block thermally coupled to the light source and the desiccant;

wherein the second compartment is at a periphery side of the first compartment and adjacent to the first compartment, the first compartment is in communication with the second compartment, and the second compartment is in communication to ambient environment.

* * * * *